United States Patent
Gotou et al.

(10) Patent No.: US 9,481,392 B2
(45) Date of Patent: Nov. 1, 2016

(54) ELECTRIC POWER STEERING DEVICE

(71) Applicants: KYB Corporation, Minato-ku, Tokyo (JP); FUJI HEAVY INDUSTRIES LTD., Shibuya-ku, Tokyo (JP)

(72) Inventors: Hiroyuki Gotou, Gifu (JP); Kazuhiro Sasaki, Gifu (JP); Yuichiro Okamoto, Frankfurt am Main (DE); Kazuma Yamazaki, Saitama (JP)

(73) Assignees: KYB Corporation, Tokyo (JP); FUJI HEAVY INDUSTRIES LTD., Tokyo (JP)

( * ) Notice: Subject to any disclaimer, the term of this patent is extended or adjusted under 35 U.S.C. 154(b) by 0 days.

(21) Appl. No.: 14/897,236

(22) PCT Filed: Jun. 4, 2014

(86) PCT No.: PCT/JP2014/064847
§ 371 (c)(1),
(2) Date: Dec. 9, 2015

(87) PCT Pub. No.: WO2014/199882
PCT Pub. Date: Dec. 18, 2014

(65) Prior Publication Data
US 2016/0144889 A1    May 26, 2016

(30) Foreign Application Priority Data
Jun. 10, 2013 (JP) ................. 2013-121622

(51) Int. Cl.
*B62D 5/04* (2006.01)

(52) U.S. Cl.
CPC .................... *B62D 5/0466* (2013.01)

(58) Field of Classification Search
CPC ...................................... B62D 5/0466
See application file for complete search history.

(56) References Cited

U.S. PATENT DOCUMENTS

| | | | | |
|---|---|---|---|---|
| 7,913,804 B2 * | 3/2011 | Ehara | ................... | B62D 5/0466 180/446 |
| 2009/0271069 A1 * | 10/2009 | Yamamoto | ............. | B62D 6/008 701/41 |
| 2016/0129933 A1 * | 5/2016 | Akatsuka | ............. | B62D 15/025 180/446 |

FOREIGN PATENT DOCUMENTS

| | | |
|---|---|---|
| JP | 5208684 A | 8/1993 |
| JP | 2002-308130 A | 10/2002 |
| JP | 2007-99053 A | 4/2007 |
| JP | 2007-320383 A | 12/2007 |
| JP | 2009-292286 A | 12/2009 |

* cited by examiner

*Primary Examiner* — Kevin Hurley
(74) *Attorney, Agent, or Firm* — Hauptman Ham, LLP

(57) ABSTRACT

An electric power steering device includes a basic return command value calculation unit configured to calculate a basic return command value in a direction returning the steering wheel to a neutral position, on the basis of detection results of a steering angle detector detecting a steering angle of the steering wheel, a first correction gain calculation unit configured to calculate a first correction gain correcting the basic return command value, on the basis of detection results of a vehicle speed detector detecting vehicle speed, and a second correction gain calculation unit configured to calculate a second correction gain correcting the basic return command value, on the basis of a change amount of the steering torque detected by the torque sensor. The basic return command value is corrected by the first and second correction gains so as to calculate a return command value. The return command value is added to the assist command value so as to drive the electric motor.

5 Claims, 6 Drawing Sheets

ELECTRIC POWER STEERING DEVICE

TECHNICAL FIELD

The present invention relates to an electric power steering device.

BACKGROUND ART

Some conventional electric power steering devices use an electric motor for assisting steering to perform return control of a steering wheel.

JP2007-320383A discloses such an electric power steering device that returns a steering wheel smoothly by performing steering wheel return control, so as not to give an uncomfortable feeling to a driver, when both of the following two conditions are satisfied at the same time: a condition that steering torque is a low torque threshold value or less and the steering wheel can be judged as being in a state of let go; and a condition that a torque change rate is a predetermined torque change rate threshold value or less.

SUMMARY OF INVENTION

According to the electric power steering device as described in JP2007-320383A, the steering wheel return control becomes complicated as whether or not the two conditions are satisfied is monitored and the steering wheel return control is performed when it is judged that the two conditions are satisfied.

It is an object of the present invention to reduce an uncomfortable feeling upon steering by simple return control.

According to one aspect of the present invention, an electric power steering device for driving an electric motor by an assist command value calculated on the basis of detection results of a torque sensor detecting steering torque inputted from a steering wheel, and for assisting steering of the steering wheel by a driver includes: a basic return command value calculation unit configured to calculate a basic return command value in a direction returning the steering wheel to a neutral position, on the basis of detection results of a steering angle detector detecting a steering angle of the steering wheel; a first correction gain calculation unit configured to calculate a first correction gain correcting the basic return command value, on the basis of detection results of a vehicle speed detector detecting vehicle speed; and a second correction gain calculation unit configured to calculate a second correction gain correcting the basic return command value, on the basis of a change amount of the steering torque detected by the torque sensor. The basic return command value is corrected by the first correction gain and the second correction gain so as to calculate a return command value, and the return command value is added to the assist command value so as to drive the electric motor.

DESCRIPTION OF EMBODIMENTS

Hereinafter, an embodiment of the present invention will be explained with reference to the drawings.

Figure 1:
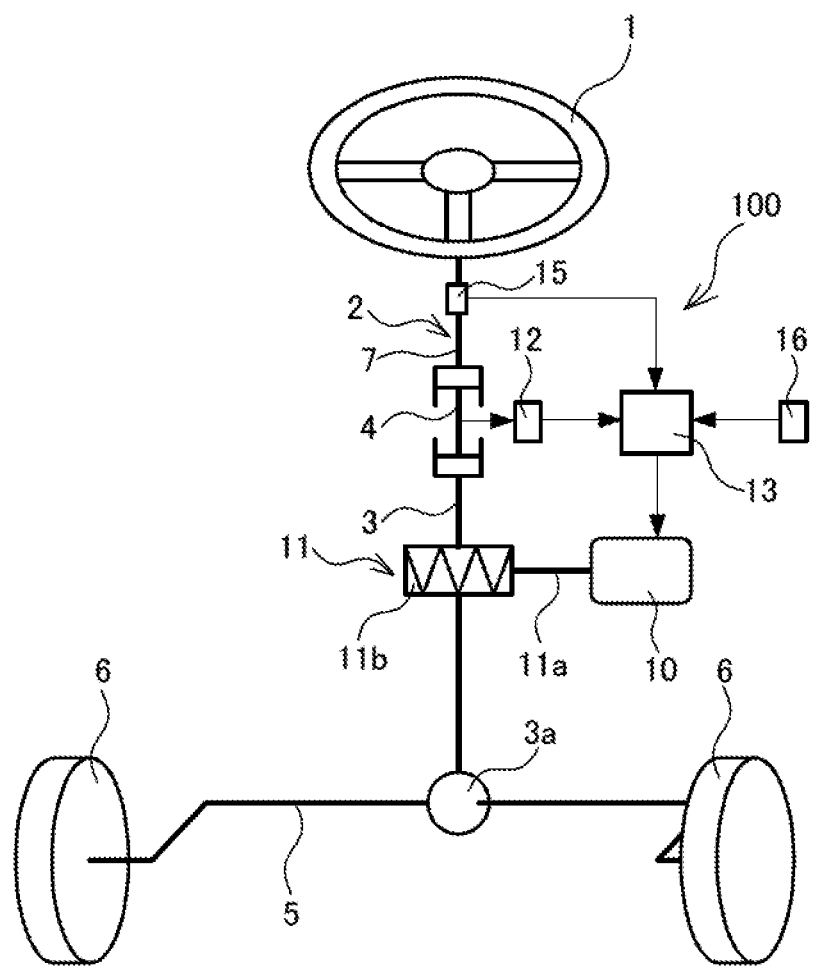
FIG. 1 is a configuration diagram of an electric power steering device according to an embodiment of the present invention.

First, the overall structure of an electric power steering device 100 according to the embodiment of the present invention will be explained with reference to FIG. 1.

The electric power steering device 100 includes an input shaft 7 that is rotated in response to operation of a steering wheel 1 by a driver, and an output shaft 3 whose upper end is connected to the input shaft 7 via a torsion bar 4 and whose lower end is linked to a rack shaft 5. The electric power steering device 100 steers wheels 6 by moving the rack shaft 5, meshing with a pinion 3a provided at the lower end of the output shaft 3, in the axial direction. The input shaft 7 and the output shaft 3 form a steering shaft 2.

Further, the electric power steering device 100 includes an electric motor 10 as a power source for assisting steering of the steering wheel 1 by the driver, a reduction gear 11 for reducing speed of rotation of the electric motor 10 and transmitting it to the steering shaft 2, a torque sensor 12 for detecting steering torque inputted from the steering wheel 1, and a controller 13 for controlling driving of the electric motor 10 on the basis of detection results of the torque sensor 12.

The reduction gear 11 is formed of a worm shaft 11a that is connected to an output shaft of the electric motor 10, and a worm wheel 11b that is connected to the output shaft 3 and meshes with the worm shaft 11a. Torque, outputted from the electric motor 10, is transmitted from the worm shaft 11a to the worm wheel 11b, and is given to the output shaft 3 as assist torque.

The torque sensor 12 detects the steering torque, given to the torsion bar 4, on the basis of relative rotation of the input shaft 7 and the output shaft 3. The torque sensor 12 outputs a voltage signal corresponding to the detected steering torque to the controller 13. On the basis of the voltage signal from the torque sensor 12, the controller 13 calculates the torque outputted from the electric motor 10, and controls the driving of the electric motor 10 so that this torque is generated. Thus, the electric power steering device 100 drives the electric motor on the basis of the detection results of the torque sensor 12 that detects the steering torque inputted from the steering wheel 1, and assists the steering of the steering wheel 1 by the driver.

The steering shaft 2 is provided with a steering angle sensor 15 as a steering angle detector for detecting a steering angle (absolute steering angle) of the steering wheel 1. Detection results of the steering angle sensor 15 are outputted to the controller 13. When the steering wheel 1 is in a neutral position, the steering angle sensor 15 outputs zero as the steering angle. When the steering wheel 1 is steered from the neutral position toward the right-turning direction, the steering angle sensor 15 outputs the steering angle with a plus sign in response to the rotation of the steering wheel 1. Meanwhile, when the steering wheel 1 is steered from the neutral position toward the left-turning direction, the steering angle sensor 15 outputs the steering angle with a minus sign in response to the rotation of the steering wheel 1.

In addition, detection results of a vehicle speed sensor 16, as a vehicle speed detector for detecting vehicle speed, are inputted to the controller 13.

The controller 13 includes a CPU for controlling operation of the electric motor 10, ROM for storing control programs, set values and the like that are required for the processing operation of the CPU, and RAM for temporarily storing information detected by the various sensors such as the torque sensor 12, the steering angle sensor 15, and the vehicle speed sensor 16.

When the vehicle is traveling, self-aligning torque acts for returning the steering wheel 1 to the neutral position. This self-aligning torque is high when traveling at a high speed and low when traveling at a low speed. When traveling at low speed with low self-aligning torque, returnability of the steering wheel 1 to the neutral position is deteriorated due to gear friction of a steering system, such as the worm shaft 11a and the worm wheel 11b. For this reason, the electric power steering device 100 performs return control for improving the returnability of the steering wheel 1 to the neutral position even when the vehicle is traveling at a low speed.

Next, the return control will be explained with reference to FIG. 2 to FIG. 6.

Figure 2:
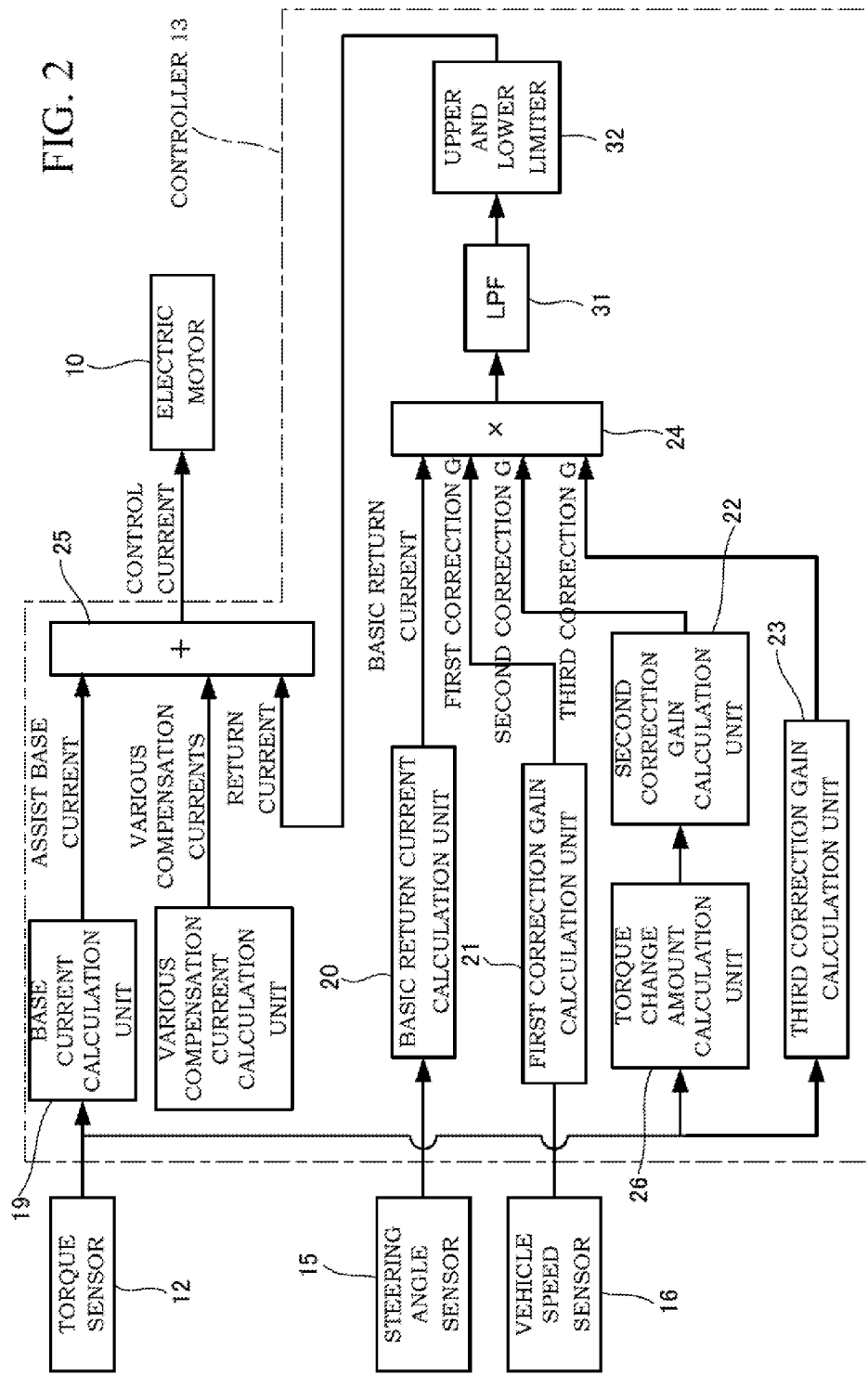
FIG. 2 is a control block diagram of the electric power steering device according to the embodiment of the present invention.

As illustrated in FIG. 2, the controller 13 calculates, in a base current calculation unit 19, an assist base current (assist command value) for controlling the driving of the electric motor 10 on the basis of the detection results of the torque sensor 12. Meanwhile, the controller 13 calculates, in a basic return current calculation unit (basic return command value calculation unit) 20, a basic return current in the direction returning the steering wheel 1 to the neutral position, as well as calculates, in a first correction gain calculation unit 21, a second correction gain calculation unit 22, and a third correction gain calculation unit 23, a first correction gain, a second correction gain, and a third correction gain for correcting the basic return current, and calculates, in a multiplier 24, a return current (return command value) by multiplying the basic return current by the first correction gain, the second correction gain, and the third correction gain. The calculated return current is added to the assist base current in an adder 25.

Hereinafter, the basic return current calculation unit 20, the first correction gain calculation unit 21, the second correction gain calculation unit 22, and the third correction gain calculation unit 23 will be explained.

First, the basic return current calculation unit 20 will be explained.

Figure 3:
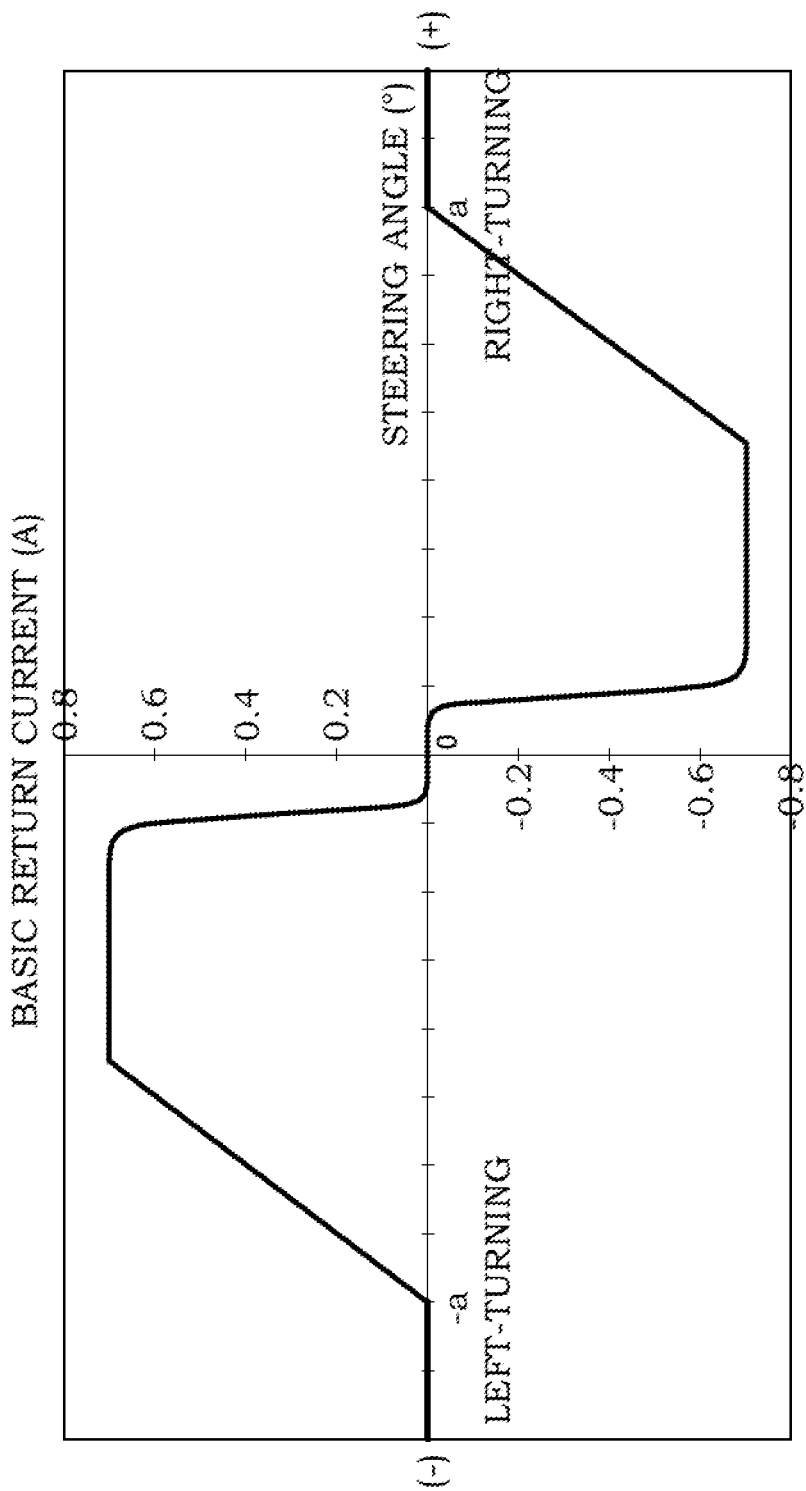
FIG. 3 is a basic map for calculating a basic return current.

The basic return current calculation unit 20 calculates the basic return current in the direction returning the steering wheel 1 to the neutral position on the basis of the detection results of the steering angle sensor 15. Specifically, by referring to a basic map as illustrated in FIG. 3, the basic return current calculation unit 20 calculates the basic return current corresponding to the steering angle inputted from the steering angle sensor 15. The basic return current is a current that is the basis of the return control.

The basic map as illustrated in FIG. 3 is a map defining the relationship between the steering angle and the basic return current, in which the horizontal axis represents the steering angle, and the vertical axis represents the basic return current. With the horizontal axis, the plus side represents the steering angle on the right-turning side from the neutral position, and the minus side represents the steering angle on the left-turning side from the neutral position. Further, with the vertical axis, the plus side represents the basic return current that assists the steering wheel 1 toward the right-turning direction, and the minus side represents the basic return current that assists the steering wheel 1 toward the left-turning direction. As is clear from FIG. 3, the basic map is characterized in that, when the steering angle is on the right-turning side, the basic return current has a value assisting toward the left-turning direction and, when the steering angle is on the left-turning side, the basic return current has a value assisting toward the right-turning direction. Thus, the basic return current, outputted by referring to the basic map, is the current in the direction returning the steering wheel 1 to the neutral position.

The basic map as illustrated in FIG. 3 will be explained in detail. A dead band is set in the vicinity of the neutral position of the steering wheel 1, in which the basic return current becomes zero. This is to prevent occurrence of disturbance caused by a detection error of the steering angle sensor 15. When an absolute value of the steering angle becomes greater than the dead band, an absolute value of the basic return current increases with a specified inclination. By adjusting this inclination, it is possible to change a feeling of return that the driver feels when the steering wheel 1 returns to the neutral position. When the inclination is set to be greater, the feeling of return increases. In a range where the absolute value of the steering angle is a predetermined value a or more, the basic return current is set to zero. This is because, as the basic return current acts to increase a steering force by the driver upon turning the steering wheel 1, the basic return current is allowed to act only in the vicinity of the neutral position and is not allowed to act when the steering wheel 1 is greatly turned. It is also because, when the steering wheel 1 is greatly turned and then returned, sudden returning should be prevented.

Next, the first correction gain calculation unit 21 will be explained.

Figure 4:
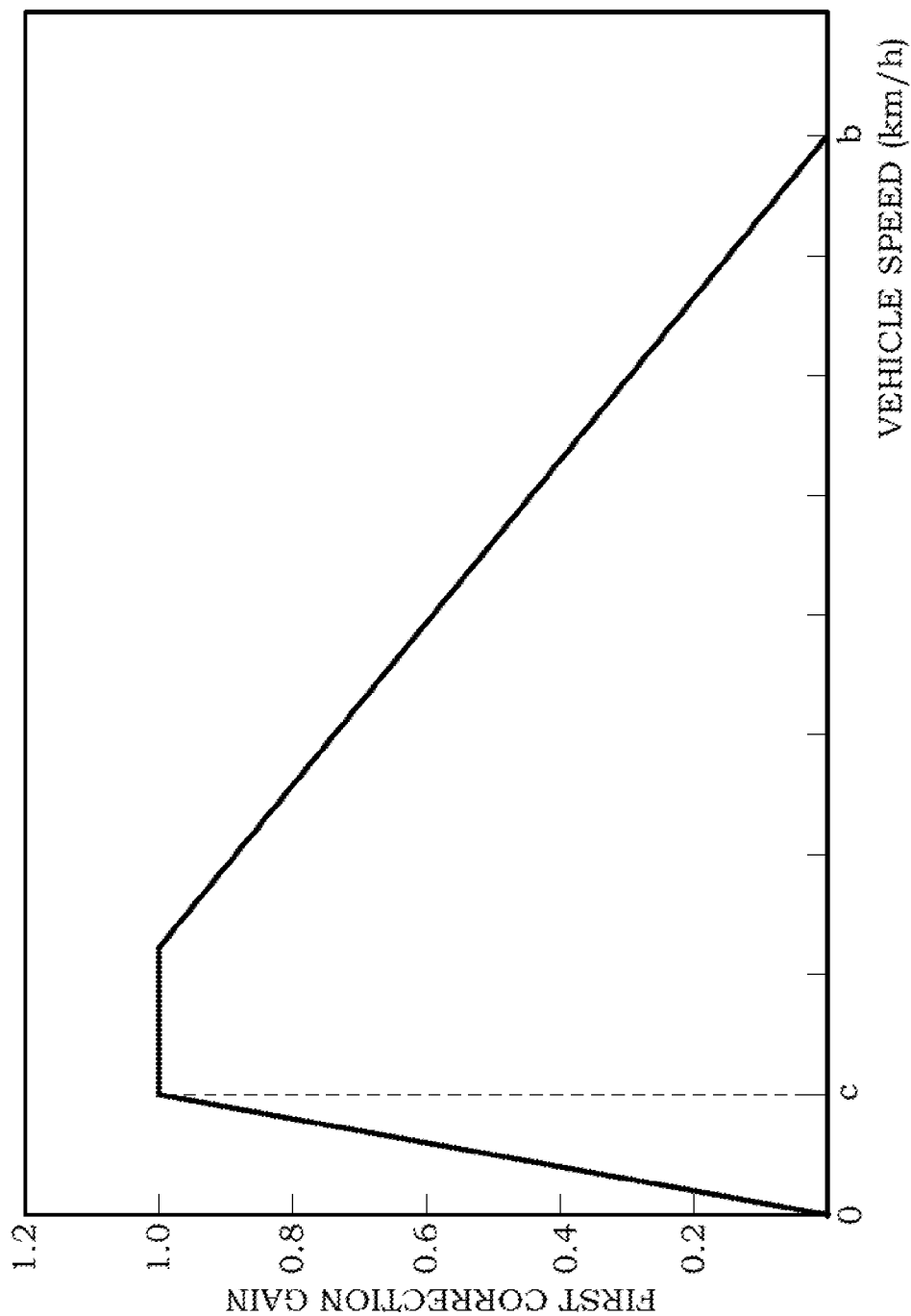
FIG. 4 is a first correction map for calculating a first correction gain.

The first correction gain calculation unit 21 calculates the first correction gain for correcting the basic return current on the basis of the detection results of the vehicle speed sensor 16. Specifically, by referring to a first correction map as illustrated in FIG. 4, the first correction gain calculation unit 21 calculates the first correction gain that corresponds to the vehicle speed inputted from the vehicle speed sensor 16. As the self-aligning torque changes in response to the vehicle speed, the basic return current is corrected by the first correction gain that changes in response to the vehicle speed.

The first correction map as illustrated in FIG. 4 is a map defining the relationship between the vehicle speed and the first correction gain, in which the horizontal axis represents the vehicle speed, and the vertical axis represents the first correction gain. The first correction gain is set to 1.0 or less over the entire range of the vehicle speed. In other words, the first correction gain is a value causing the basic return current to decrease. As the self-aligning torque is high when traveling at a high speed and low when traveling at a low speed, the first correction gain is set to be higher in the low speed region and set to be lower as the vehicle speed increases, as illustrated in FIG. 4, and is set to zero at a predetermined speed b or more. Further, the first correction gain decreases with a specified inclination from a predetermined very low speed c to a vehicle stop state, and is set to zero in the vehicle stop state. The first correction gain is thus decreased with the specified inclination in order to reduce an uncomfortable feeling upon steering, caused in the vehicle stop state when the first correction gain becomes zero.

Next, the second correction gain calculation unit 22 will be explained.

Figure 5:
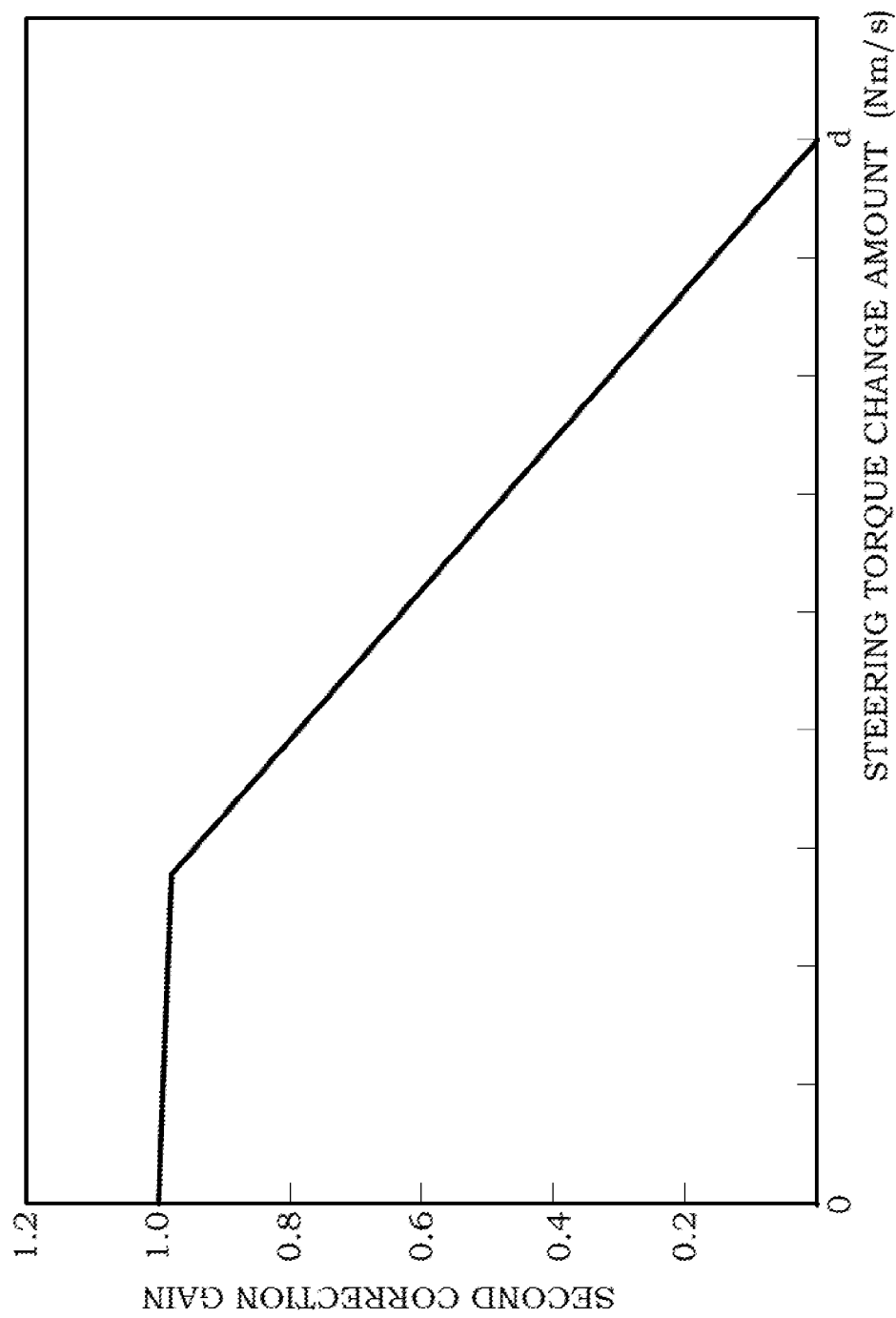
FIG. 5 is a second correction map for calculating a second correction gain.

The second correction gain calculation unit 22 calculates the second correction gain for correcting the basic return current on the basis of a steering torque change amount calculated by a torque change amount calculation unit 26. Specifically, by referring to a second correction map as illustrated in FIG. 5, the second correction gain calculation unit 22 calculates the second correction gain that corresponds to the steering torque change amount inputted from the torque change amount calculation unit 26. The torque change amount calculation unit 26 calculates the steering torque change amount from the steering torque detected by the torque sensor 12.

The second correction map as illustrated in FIG. 5 is a map defining the relationship between the steering torque change amount and the second correction gain, in which the horizontal axis represents the steering torque change amount, and the vertical axis represents the second correction gain. The second correction gain is set to 1.0 or less over the entire range of the steering torque change amount. In other words, the second correction gain is also a value causing the basic return current to decrease, similarly to the first correction gain.

As illustrated in FIG. 5, the second correction gain is set to have a smaller value as the steering torque change amount increases, and is set to zero when the steering torque change amount is equal to or greater than a predetermined steering torque change amount d. Thereby, the basic return current is corrected to decrease by the second correction gain when the steering wheel 1 is turned quickly, which makes it possible to improve a steering feeling without causing the driver to feel as if the steering is heavy by the return control. When the steering wheel 1 is greatly turned and then returned by releasing a hand therefrom, the returning of the steering wheel 1 begins slowly as the second correction gain is low in the early stage when the steering torque change amount is large, but in the vicinity of the neutral position, where the steering torque change amount decreases, the returning of the steering wheel 1 is performed quickly and smoothly as the second correction gain gradually increases. Thus, the returning of the steering wheel 1 can be performed smoothly when the hand is released from the steering state. As has been described thus far, the second correction gain corrects the basic return current according to a driver's steering intention and, by correcting the basic return current by the second correction gain, an uncomfortable feeling upon steering can be reduced.

When the vehicle travels on roads with uneven spots, such as on gravel roads, the steering wheel 1 sometimes rotates irrespective of the driver's intention, because so-called kickback, as an impact from the road, is transmitted to the steering wheel 1. When the return control is also applied to the rotation of the steering wheel 1 caused by the kickback, the steering wheel 1 is controlled irrespective of the driver's steering intention, which is not favorable. For this reason, it is desirable to set the predetermined steering torque change amount d to have a smaller value than the torque change amount caused by the assumed kickback. As the second correction gain becomes zero and the basic return current becomes zero when the kickback is caused, the return control is not applied.

Next, the third correction gain calculation unit 23 will be explained.

The third correction gain calculation unit 23 calculates the third correction gain for correcting the basic return current on the basis of the detection results of the torque sensor 12. Specifically, by referring to a third correction map as illustrated in FIG. 6, the third correction gain calculation unit 23 calculates the third correction gain that corresponds to the steering torque inputted from the torque sensor 12.

Figure 6:
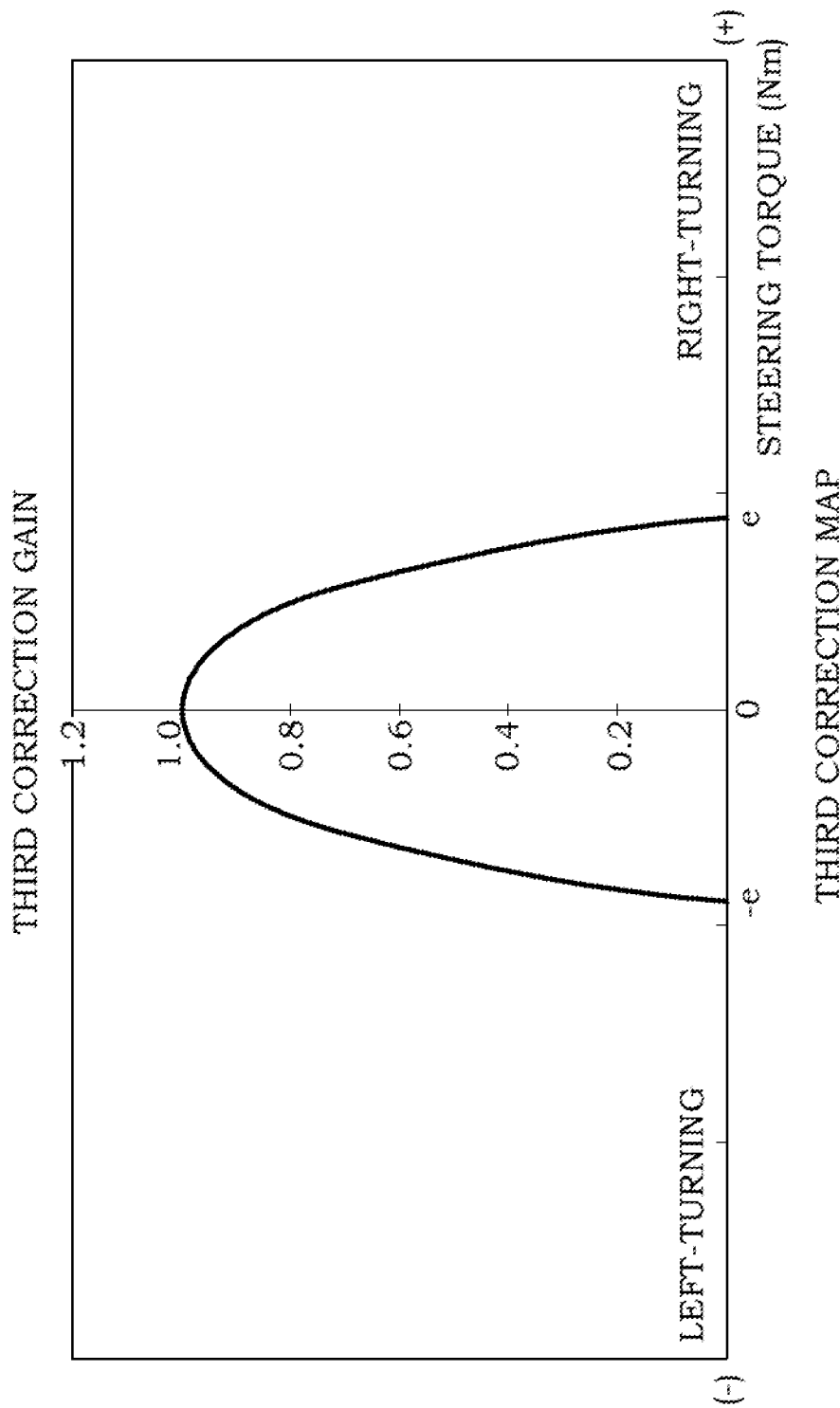
FIG. 6 is a third correction map for calculating a third correction gain.

The third correction map as illustrated in FIG. 6 is a map defining the relationship between the steering torque and the third correction gain, in which the horizontal axis represents the steering torque, and the vertical axis represents the third correction gain. With the horizontal axis, the plus side represents the steering torque on the right-turning side from the neutral position, and the minus side represents the steering torque on the left-turning side from the neutral position. The third correction gain is set to 1.0 or less over the entire range of the steering torque. In other words, the third correction gain is also a value causing the basic return current to decrease, similarly to the first correction gain and the second correction gain.

As illustrated in FIG. 6, the third correction gain is set to have a smaller value as the absolute value of the steering torque increases, and is set to zero when the absolute value of the steering torque is equal to or greater than a predetermined value e. In the range where the absolute value of the steering torque is smaller than the predetermined value e, the third correction gain is set to change in a curve shape in response to the change in the steering torque. The predetermined value e is desirably set in such a manner that the third correction gain becomes zero when the steering wheel 1 is turned. Thereby, the basic return current is corrected to become zero by the third correction gain when the steering wheel 1 is turned, which makes it possible to improve the steering feeling without causing the driver to feel as if the steering is heavy by the return control. When the steering wheel 1 is turned and then returned by releasing a hand therefrom, the returning of the steering wheel 1 begins slowly as the third correction gain becomes zero in the early stage when the steering torque is high, but in the vicinity of the neutral position, where the steering torque becomes low, the returning of the steering wheel 1 is made quickly and smoothly as the third correction gain gradually increases. Thus, the returning of the steering wheel 1 can be made smoothly when the hand is released from the steering state. As has been described thus far, the third correction gain corrects the basic return current according to the driver's steering intention and, by correcting the basic return current by the third correction gain, the uncomfortable feeling upon steering can be reduced, similarly to the second correction gain. When the steering wheel 1 is held in the vicinity of the neutral position, the absolute value of the steering torque is smaller than the predetermined value e, hence the return control is applied so as to hold the steering wheel 1 at the neutral position.

The thus-calculated basic return current, first correction gain, second correction gain, and third correction gain are subjected to multiplication in the multiplier 24, as illustrated in FIG. 2, processed by a low pass filter 31 and an upper and lower limiter 32, and added, as the return current, to the assist base current in the adder 25. It should be noted that, in the adder 25, various compensation currents are also added for compensating for the gear friction and the like. A control current, outputted from the adder 25, controls the driving of the electric motor 10.

The following effects can be obtained by the above-described embodiment.

According to this embodiment, the electric motor 10 is driven by adding the return current to the assist base current without determining the turning and returning of the steering wheel 1. The return current is calculated by correcting the basic return current, that is calculated on the basis of the steering angle, by the first correction gain that is calculated on the basis of the vehicle speed, the second correction gain that is calculated on the basis of the steering torque change amount, and the third correction gain that is calculated on the basis of the steering torque. Therefore, the uncomfortable feeling upon steering can be reduced by a simple return control.

Incidentally, the third correction gain is not an essential factor for correcting the basic return current. It is possible to provide certain degrees of effects of reducing the uncomfortable feeling upon steering by the simple return control when the basic return current is corrected by only the first correction gain and the second correction gain.

Embodiments of this invention were described above, but the above embodiments are merely examples of applications of this invention, and the technical scope of this invention is not limited to the specific constitutions of the above embodiments.

This application claims priority based on Japanese Patent Application No. 2013-121622 filed with the Japan Patent Office on Jun. 10, 2013, the entire contents of which are incorporated into this specification.

The invention claimed is:

1. An electric power steering device for driving an electric motor by an assist command value calculated on the basis of detection results of a torque sensor detecting steering torque inputted from a steering wheel, and for assisting steering of the steering wheel by a driver, the electric power steering device comprising:
   a basic return command value calculation unit configured to calculate a basic return command value in a direction returning the steering wheel to a neutral position, on the basis of detection results of a steering angle detector detecting a steering angle of the steering wheel;
   a first correction gain calculation unit configured to calculate a first correction gain correcting the basic return command value, on the basis of detection results of a vehicle speed detector detecting vehicle speed; and
   a second correction gain calculation unit configured to calculate a second correction gain correcting the basic return command value, on the basis of a change amount of the steering torque detected by the torque sensor,
   wherein the basic return command value is corrected by the first correction gain and the second correction gain so as to calculate a return command value, and the return command value is added to the assist command value so as to drive the electric motor; and
   the second correction gain is set to have a smaller value as the change amount of the steering torque increases, and is set to zero when the change amount of the steering torque is equal to or greater than a predetermined change amount of the steering torque.

2. The electric power steering device according to claim 1,
   wherein the predetermined change amount of the steering torque is set to have a smaller value than the change amount of the steering torque caused by an assumed kickback.

3. The electric power steering device according to claim 1, further comprising
   a third correction gain calculation unit configured to calculate a third correction gain correcting the basic return command value, on the basis of the steering torque detected by the torque sensor,
   wherein the basic return command value is corrected by the first correction gain, the second correction gain, and the third correction gain so as to calculate the return command value, and the return command value is added to the assist command value so as to drive the electric motor.

4. The electric power steering device according to claim 3,
   wherein the third correction gain is set to have a smaller value as an absolute value of the steering torque increases, and is set to zero when the absolute value of the steering torque is a predetermined value or more.

5. The electric power steering device according to claim 1,
   wherein each of the correction gains is 1.0 or less.

* * * * *